United States Patent
Hirota et al.

(10) Patent No.: US 6,314,753 B1
(45) Date of Patent: Nov. 13, 2001

(54) SUPERCOOLING DEGREE-CONTROLLED EXPANSION VALVE

(75) Inventors: Hisatoshi Hirota; Tokumi Tsugawa; Yusuke Inoue, all of Tokyo (JP)

(73) Assignee: TGK Co. Ltd., Tokyo (JP)

( * ) Notice: Subject to any disclaimer, the term of this patent is extended or adjusted under 35 U.S.C. 154(b) by 0 days.

(21) Appl. No.: 09/588,450

(22) Filed: Jun. 6, 2000

(30) Foreign Application Priority Data

Jun. 24, 1999 (JP) .................................................. 11-177576

(51) Int. Cl.[7] ...................................................... F25B 41/04
(52) U.S. Cl. ......................................... 62/528; 137/543.23
(58) Field of Search ................ 62/527, 528; 137/543.23, 137/543, 543.17, 546

(56) References Cited

U.S. PATENT DOCUMENTS

| | | | |
|---|---|---|---|
| 2,960,998 | * 11/1960 | Sinker et al. | 137/543.23 |
| 3,559,678 | * 2/1971 | Donner | 137/543.23 |
| 3,565,100 | * 2/1971 | Pfleger | 137/543.23 |
| 4,009,592 | * 3/1977 | Boerger | 62/527 |
| 4,324,112 | 4/1982 | Fujiwara et al. | 62/511 |
| 4,951,478 | * 8/1990 | McDonald | 62/528 |
| 4,953,589 | * 9/1990 | Nakamura | 137/543.23 |
| 5,170,638 | * 12/1992 | Koenig et al. | 62/528 |

* cited by examiner

*Primary Examiner*—William E. Tapolcai
(74) *Attorney, Agent, or Firm*—Nilles & Nilles SC

(57) ABSTRACT

To achieve a silent, noiseless operation supercooling degree-controlled expansion valve 10 wherein vibration of a valve element 14 induced by refrigerant flow changes is suppressed and a spring 18 presses valve element 14 in an oblique direction inclined with respect to an axial direction thereof against a surrounding member 12 to thereby restrict vibration of the valve element.

8 Claims, 10 Drawing Sheets

SUPERCOOLING DEGREE-CONTROLLED EXPANSION VALVE

BACKGROUND OF THE INVENTION

1. Field of the Invention

In refrigerating cycles so-called thermostatic expansion valves are widely used. Thermostatic expansion valves are designed to control the flow rate of the refrigerant being introduced into an evaporator in accordance with the temperature and pressure of the low-pressure refrigerant exiting the evaporator.

Another possibility to control the flow rate of the refrigerant flowing into the evaporator is to use a so-called supercooling degree-controlled expansion valve, which in contrast to said thermostatic expansion valve detects and controls the degree of supercooling of the high-pressure refrigerant supplied to the evaporator. A supercooling degree-controlled expansion valve performs all required operations at the inlet side of the evaporator without needing any thermostatic equipment or additional temperature or pressure transmitting passages. This is advantageous because a supercooling degree-controlled expansion valve can be made extremely compact.

2. Description of the Related Art

In a supercooling degree-controlled expansion valve disclosed in U.S. Pat. No. 4,324,112 for example, the valve seat is arranged in a high-pressure refrigerant passage through which the refrigerant is supplied to the evaporator and at a location of an upstream side of a restricted portion formed by narrowing an intermediate portion of the refrigerant passage. The valve element for opening and closing the refrigerant passage faces the valve seat and is urged towards the valve seat by urging means from a downstream side. This valve type is structurally simple and compact and yet is capable of controlling the degree of supercooling of the high-pressure refrigerant at a constant level. However, in said known supercooling degree-controlled expansion valves the valve element freely vibrates due to the refrigerant flow and repeatedly collides against its surrounding member thus producing noise.

In high-pressure hydraulic applications it is known to equip, e.g., a relief valve element with a damping piston received in a cylinder chamber to suppress valve rattling. However, supercooling degree-controlled expansion valves need to operate reliably, extremely sensitive and in an environment (most often in the motor compartment of a vehicle) where permanently external vibration and considerable temperature changes occur. For this reason it was believed that the performance of such supercooling degree-controlled expansion valves would unduly suffer when implementing any vibration attenuating measures.

OBJECTS AND SUMMARY OF THE INVENTION

It is an object of the invention to provide a structurally simple noiseless, silent supercooling degree-controlled expansion valve in which vibrations of the valve element induced by the refrigerant flow are suppressed sufficiently without deteriorating the valve performance, i.e. without harming the capacity of the valve to control an essential constant degree of supercooling.

Since the urging means in the supercooling degree-controlled expansion valve is pressing the valve element in an oblique direction inclined with respect to the axial direction of said valve element against a surrounding member or the surrounding when said valve member is moving in relation to said valve seat, noise is prevented from being produced as soon as the valve element has the tendency to collide during vibration under the influence of the refrigerant flow, etc. with its surrounding. Alternatively, a liquid damper using the refrigerant as a vibration absorbing material is coupled to the valve element to restrict vibrations of the valve element. A silent, high-quality supercooling degree-controlled expansion valve can be achieved.

A particular simple structure of said expansion valve with a vibration safe valve element is achieved by determining the mechanical co-operation between the compression coil spring and the valve member such that the compression coil spring maintains the valve element during its motions in contact with the lateral surroundings. This either is achieved by a protruding spring turn end contacting the valve element offset to its longitudinal axis or by arranging the active compression coil spring end portion laterally offset with respect to the longitudinal axis of the valve element. Said predetermined co-operation suppresses particularly lateral vibrations of the valve element, because this is maintained in contact with the lateral surroundings while moving in relation to the valve seat, advantageously, said measure does not lead to any detrimental effect on the valve performance.

When alternatively coupling the valve element with a liquid damper the refrigerant efficiently can be used to absorb vibrations of the valve element, particularly axial vibrations. The motion of the valve element during operation of the expansion valve sucks in or pumps out refrigerant into or from the cylinder chamber and through a narrow gap. The flow through said narrow gap is restricted and thus suppresses the vibration.

BRIEF DESCRIPTION OF THE DRAWINGS

Embodiments of the invention will be described with the help of the drawing. In the drawing is.

DESCRIPTION OF THE PREFERRED EMBODIMENTS

Figure 1:
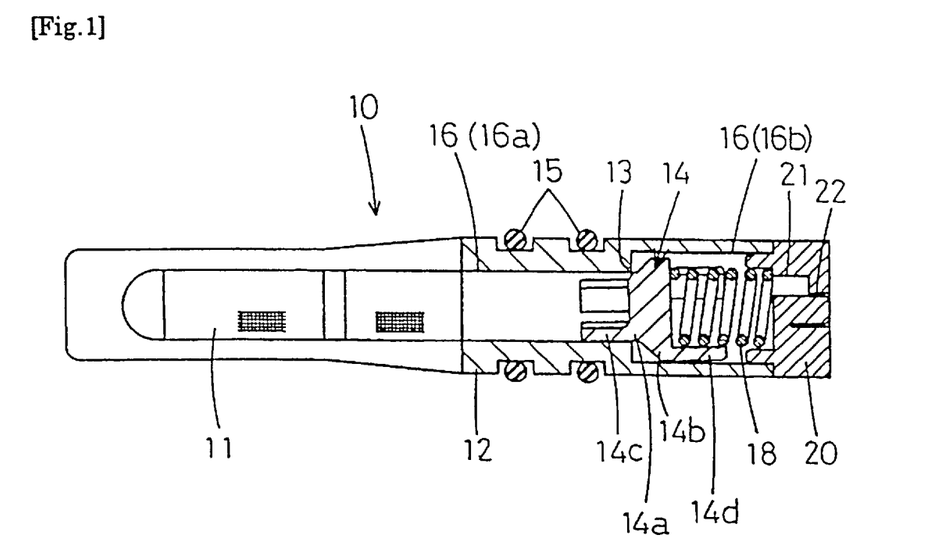
FIG. 1 a longitudinal section of a first embodiment of an expansion valve in a state where a valve element is lifted from a valve seat, FIG. 2 a longitudinal section as in FIG. 1 with the valve element seated on said valve seat, FIG. 3 a cross-sectional view in section plane III—III of FIG. 2, FIG. 4 a longitudinal section of a refrigerant pipe receiving said expansion valve of FIGS. 1 to 3, FIG. 5 a longitudinal section of a second embodiment of an expansion valve, FIG. 6 a side view of a third embodiment of a supercooling degree-controlled expansion valve, FIG. 7 a longitudinal section of the third embodiment illustrating a flow direction from the right to the left, FIG. 8 a longitudinal section similar to FIG. 7 illustrating a flow direction from the left to the right, FIG. 9 an enlarged sectional side view of a detail of said third embodiment, FIG. 10 an enlarged sectional side view of another detail of said third embodiment, FIG. 11 a cross-section taken in plane XI—XI in FIG. 9, FIG. 12 a cross-section taken in plane XII—XII in FIG. 9, FIG. 13 a longitudinal sectional view of a fourth embodiment, and FIG. 14 a longitudinal sectional view of a fifth embodiment of a supercooling degree-controlled expansion valve.
Figure 2:
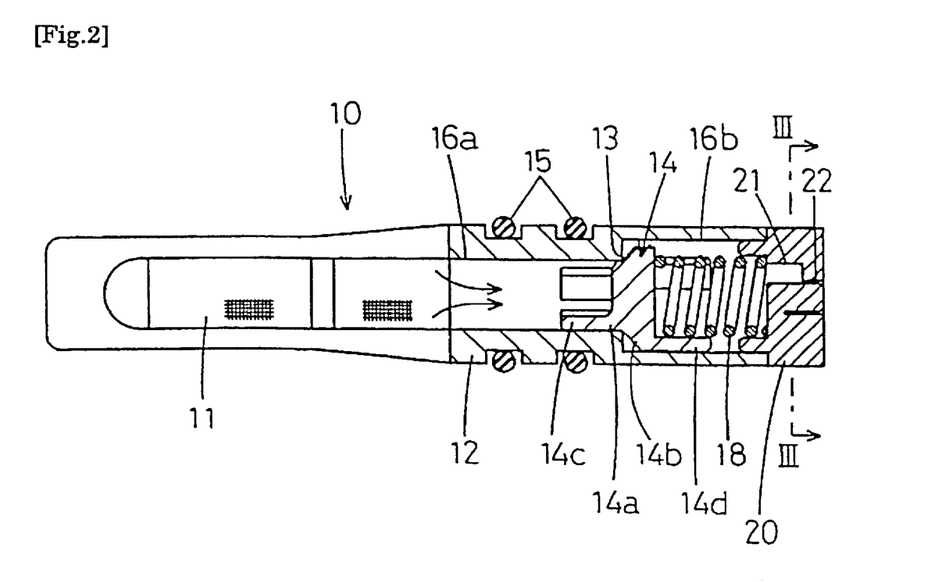
Figure 3:
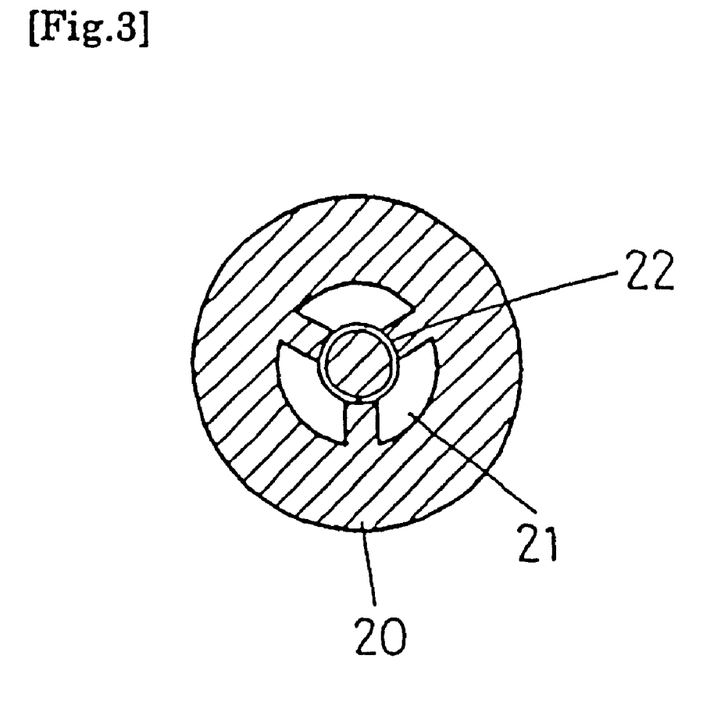
Figure 4:
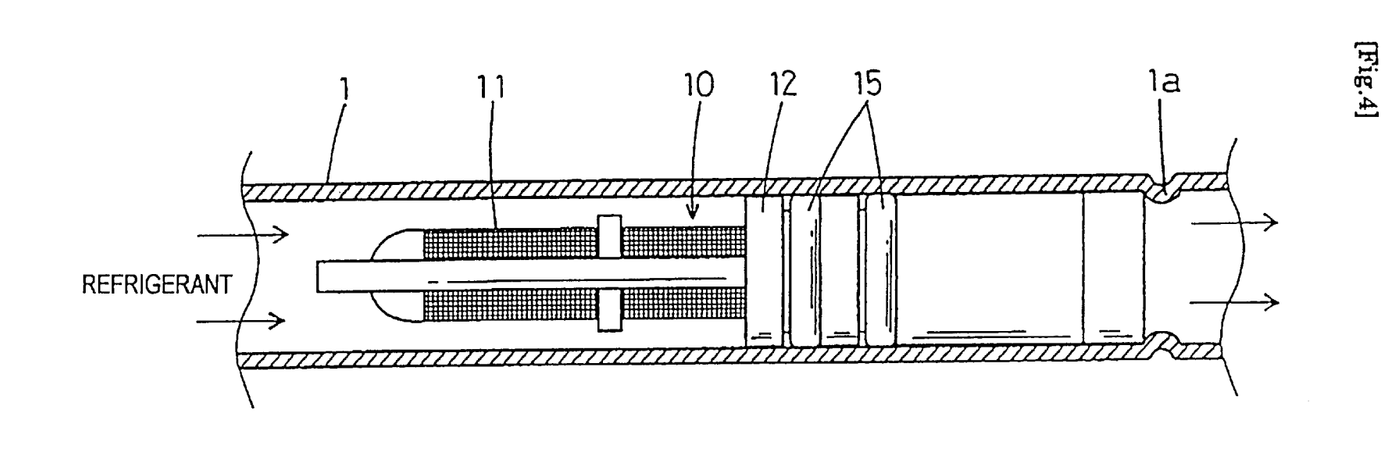

FIGS. 1 to 3 illustrate a first embodiment of a supercooling degree-controlled expansion valve 10. FIG. 4 shows said expansion valve 10 fitted into a refrigerant pipe 1 of an automobile cooling system, for example. In FIG. 4 high-pressure refrigerant is introduced from an upstream (left) side into refrigerant pipe 1. Expansion valve 10 abuts against a waist 1a formed, e.g. by crimping said refrigerant pipe 1. A dust-removing filter 11 is attached to an upstream-side half of expansion valve.

In FIG. 2 expansion valve 10 is closed. A valve element 14 is resiliently urged from downstream against a valve seat 13 formed in a cylindrical case 12. Said dust-removing filter 11 (a cap made of fine meshed net) is attached to said cylindrical case 12. A downstream restricted passage 22 is provided. Dust-removing filter 11 catches impurities greater than a certain size. Accordingly, rubbish, etc. contained in the refrigerant is held back by the filter 11 and is prevented from flowing into the expansion valve or into said restricted passage 22. O-rings 15 fitted onto cylindrical case 12 seal between said case and the inner surface of refrigerant pipe 1.

Valve seat 13 has inner circular edge at a stepped portion of a refrigerant passage 16 formed in cylindrical case 12. Said refrigerant passage 16 has an upstream-side passage 16a with a small diameter and a downstream-side passage 16b with a large diameter.

Valve element 14 (FIG. 1) has a closing part 14a fitted into the valve seat 13, a conical part 14b facing said valve seat edge from a downstream side, three guide legs 14c extending through valve seat 13 and along the inner peripheral surface of the upstream-side passage 16a, and three supporting legs 14d protruding downstream and extending along the inner peripheral surface of downstream-side passage 16b.

Valve element 14 faces valve seat 13 while being urged from downstream by a compression coil spring 18, defining said resilient urging means of the expansion valve 10. Depending on the relative magnitude of the refrigerant pressure difference between the upstream and downstream sides of valve seat 13 and on the urging force of compression coil spring 18, valve element 14 comes in contact with or is separated from said valve seat edge, in order to control the flow rate of the refrigerant passing through said refrigerant pipe 1.

Said compression coil spring 18 does not have end turns at its opposite ends which end turns would define a plane perpendicular to the longitudinal spring axis, but each end portion is formed by simply cutting the wire member constituting the spring turns. Particularly, a freely terminating turn end is made by cutting the end turn, e.g., perpendicular to the core line of said end turn. Said end turn may extend towards said free turn end with at least essentially the same turn pitch as other spring turns in said compression coil spring. Consequently, the urging force of the compression coil spring 18 acts upon the valve element 14 in a oblique direction inclined with respect thereto.

The free turn end of compression coil spring 18 contacts an abutment surface of said valve element 14 which is surrounded by said legs 14d and at a force transmission spot which is offset with respect to the longitudinal axis of valve element 14. Instead or in addition, said abutment surface could be inclined with respect to the longitudinal axis of said valve element 14 by an angle differing from 90°.

A spring seat member 20 receives a fixed end portion of said compression coil spring 18. Seat member 20 is secured to a downstream-side end of cylindrical case 12. In FIG. 3 spring seat member 20 has an annular restriction defining said restricted passage 22. It has a small cross-sectional area and is continuing circumferentially distributed refrigerant passage holes 21. The refrigerant passing therethrough adiabatically expands on the downstream side of said restricted passage 22. An evaporator (not shown) is connected to the downstream side of expansion valve 10, so that the refrigerant is introduced into the evaporator while being adiabatically expanded.

The high-pressure refrigerant at the upstream side of valve seat 13 is in a supercooled liquid state. After passing the gap between the valve seat edge and lifted valve element 14, however, it is no longer supercooled but develops bubbles.

If the degree of supercooling of the high-pressure refrigerant at the upstream side decreases, more bubbles are produced in the refrigerant on the downstream side of the valve seat 13, causing a consequent reduction in the refrigerant flow rate. Valve element 14, therefore, is moved in closing direction (FIG. 2) with the result that the degree of supercooling of the refrigerant at the upstream side does increase again. If the degree of supercooling of the high-pressure refrigerant at the upstream side increases, less bubbles are produced in the refrigerant at the downstream side of valve seat 13. The refrigerant flow rate increases as well. Valve element 14, therefore, is moved in opening direction (FIG. 1) thus reducing the degree of supercooling at the upstream side. Thanks to these valve element motions, the degree of supercooling of the high-pressure refrigerant is maintained constant at the upstream side.

During its motion valve element 14 remains pressed against the inner peripheral surface of refrigerant passage 16, since the urging force of compression coil spring 18 is acting upon the valve element 14 in an oblique direction, i.e., is inclined with respect to its axial direction or the direction of its longitudinal axis, respectively. As a result, valve element 14 is never allowed to vibrate freely in lateral directions even if the refrigerant flow changes or more or less bubbles occur, or like occurs, and thus no noise is produced.

Figure 5:
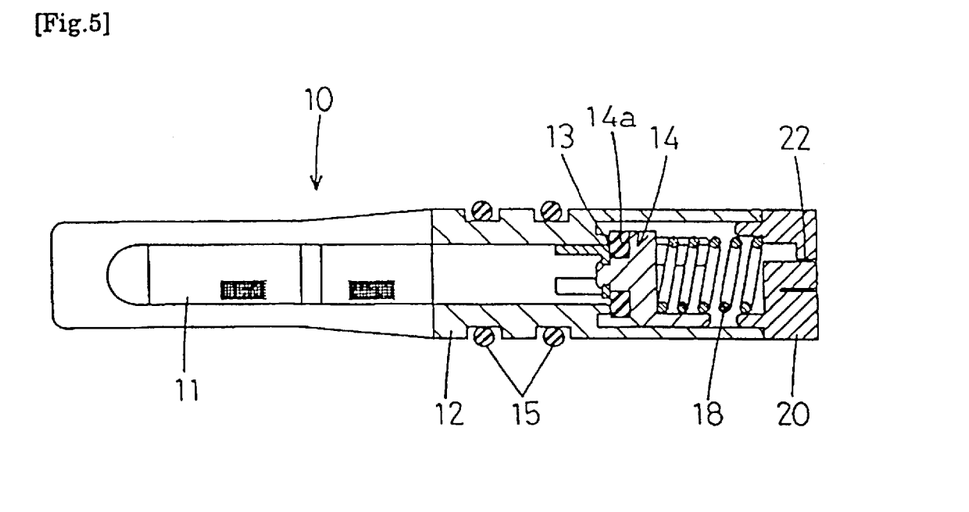

FIG. 5 (a second embodiment) closing part 14a of valve element 14 is not fitted into valve seat 13 (as in FIG. 1), but directly abuts against the valve seat 13 from the downstream side to close the refrigerant passage 16. Valve seat 13 is constituted by an annular, axially extending rib. Closing part 14a here is made of an elastic material such as rubber. Other structural features in the operation are the same as with the first embodiment.

Figure 6:
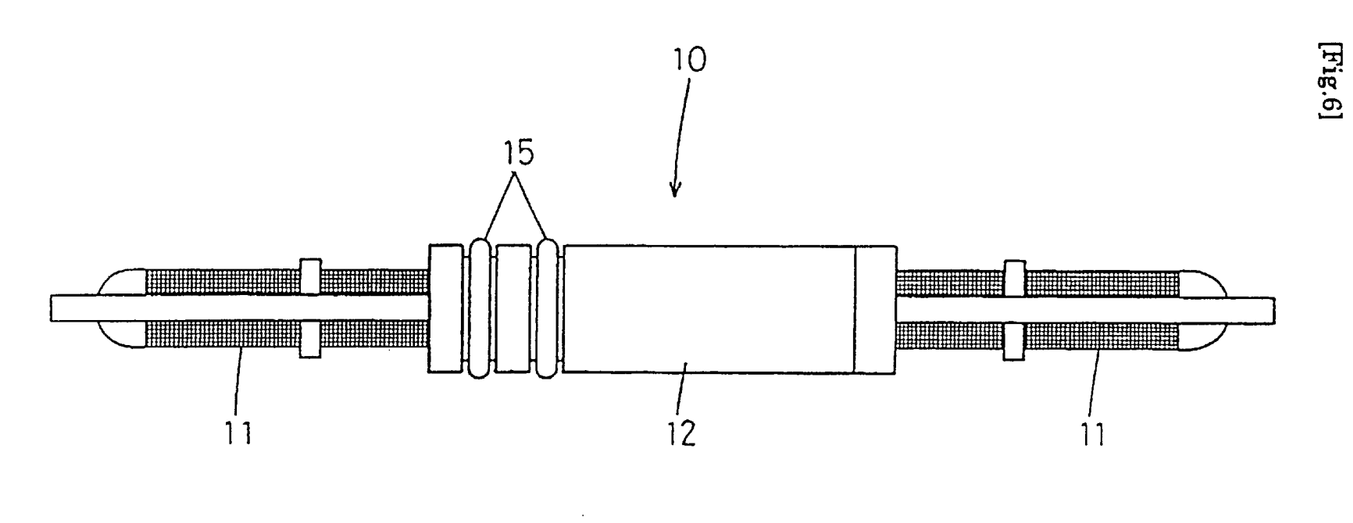

In FIGS. 7 through 12 a third embodiment is a bi-directional supercooling degree-controlled expansion valve 10 (the refrigerant can flow in opposite directions). In FIG. 6 dust-removing filters 11 are attached to both, front and rear ends of the expansion valve 10, respectively.

Figure 7:
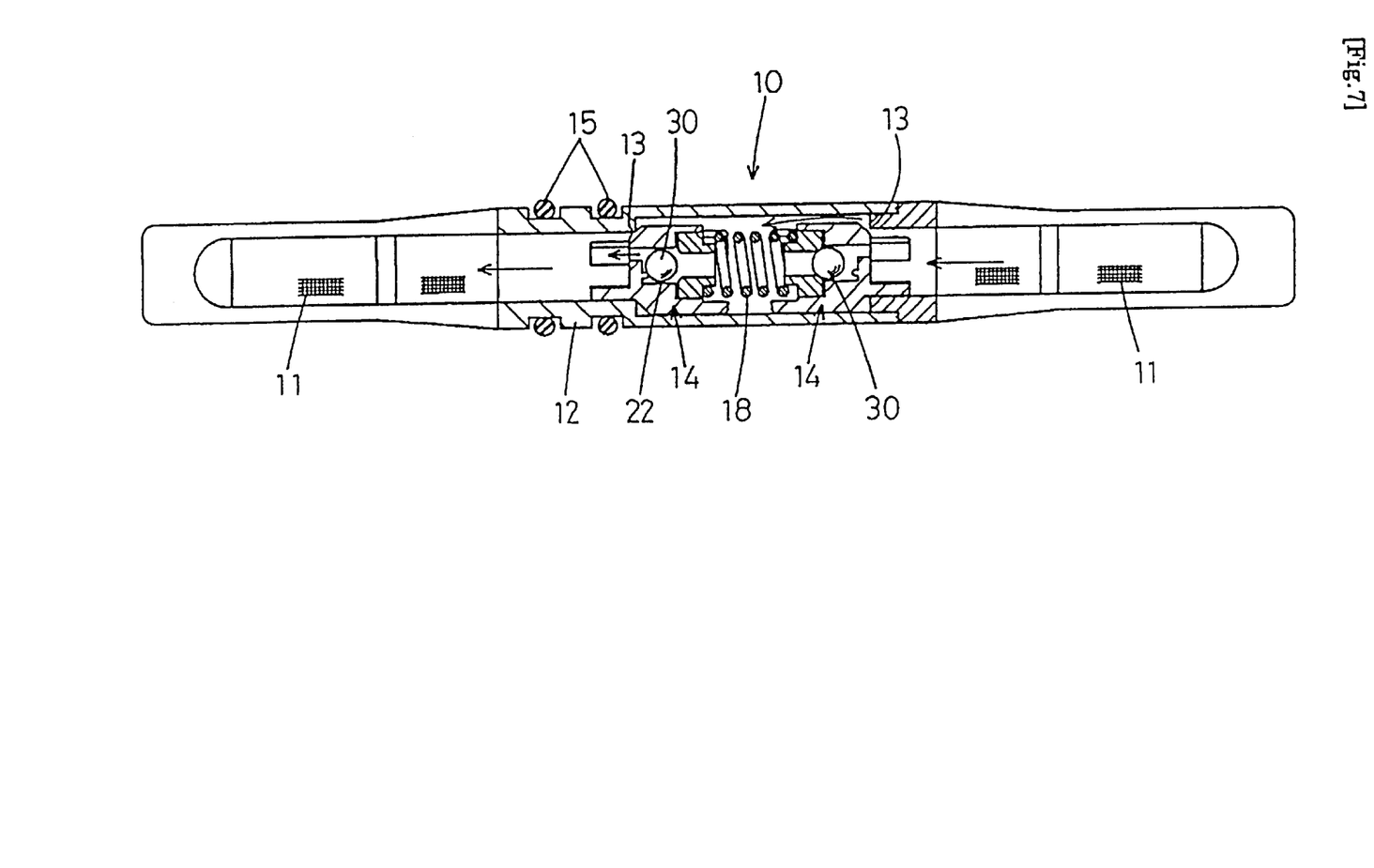
Figure 8:
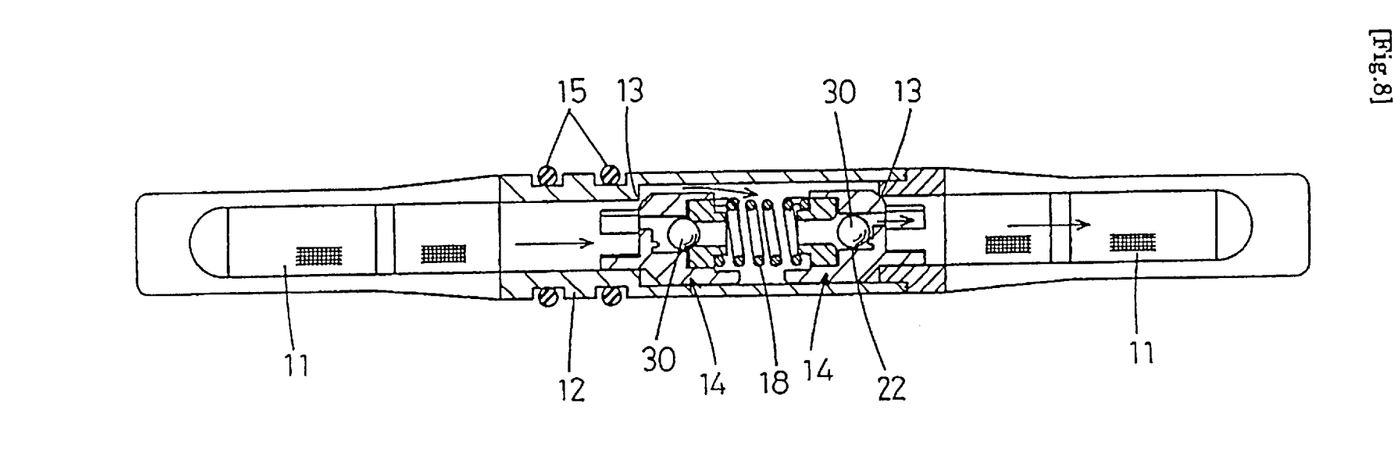

In FIGS. 7 and 8 two valve seats 13 are arranged in series and two valve elements 14 are arranged back-to-back between valve seats 13. Compression coil spring 18 constituting the urging means for both valve elements is interposed between both valve elements 14.

Figure 9:
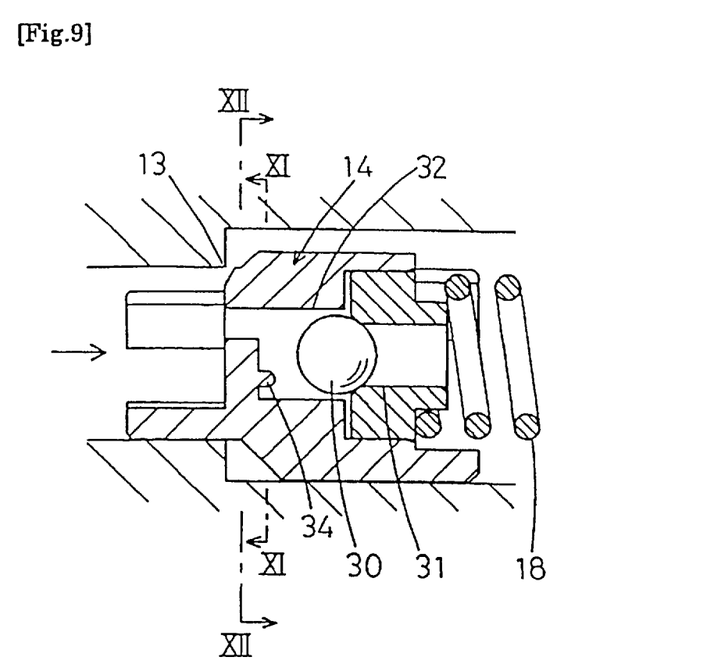
Figure 10:
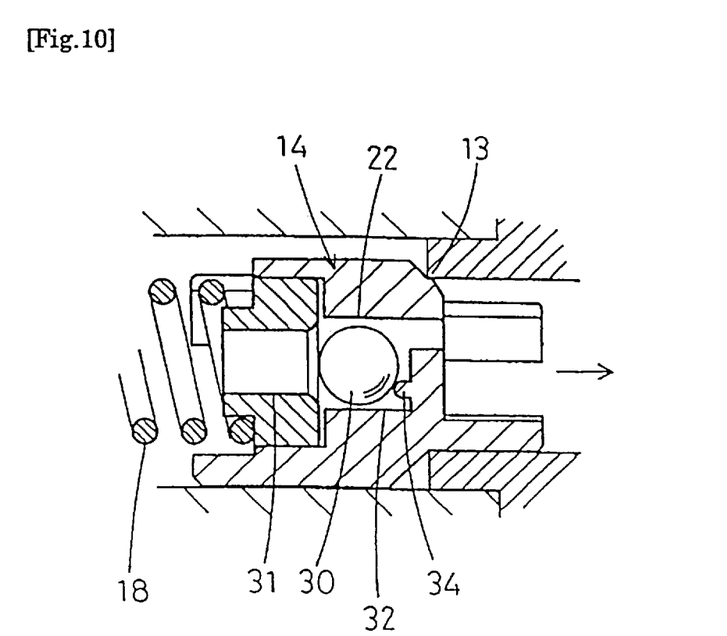
Figure 11:
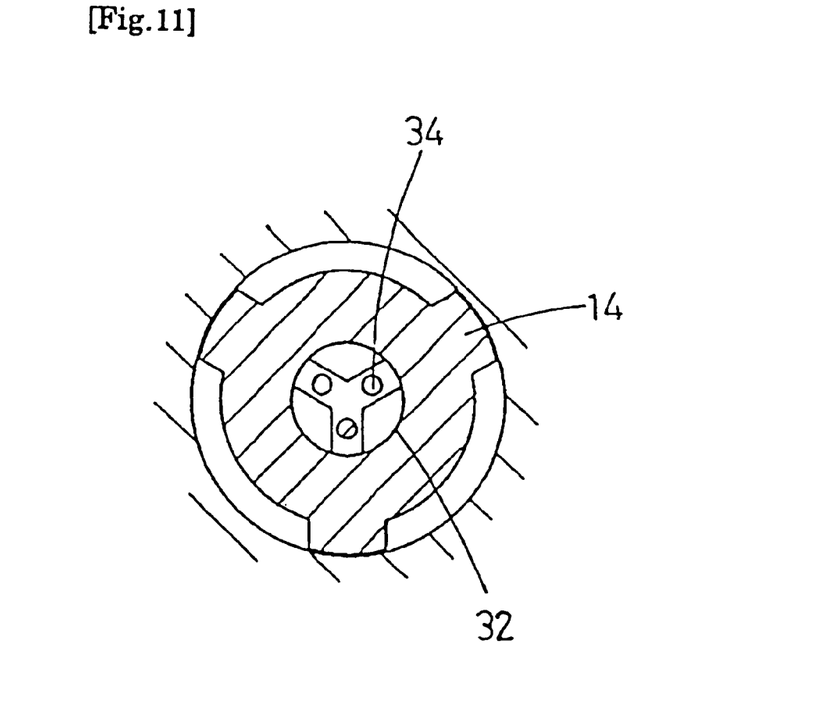
Figure 12:
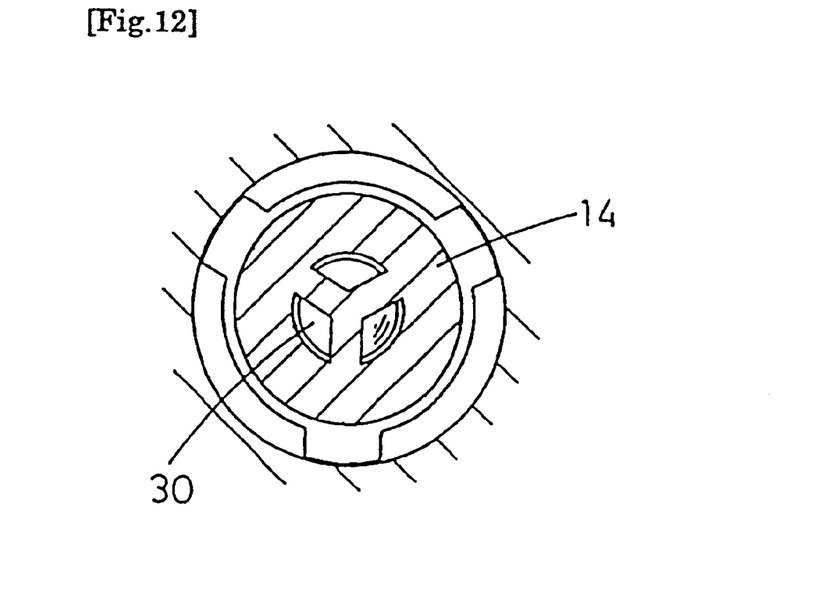

Restricted passages 22 each for adiabatically expanding the refrigerant depending on the flow direction are defined by spherical valve elements 30 arranged within said valve elements 14. In FIGS. 9 and 10 each valve element 14 has a spherical-valve receiving chamber 32 formed in an intermediate portion of an axially extending refrigerant passage 31 receiving the corresponding spherical valve element 30.

Of the two spherical valve elements 30, that valve element 30 in the respective upstream-side valve element 14 closes the refrigerant passage 31, as shown in FIG. 9. The spherical-valve receiving chamber 32 has a diameter size larger than the diameter of the spherical valve element 30. A gap is formed around the downstream-side spherical valve element 30, while this is in contact with and centred by three small protuberances 34 (FIG. 10). Restricted passage 22 is defined by said gap in the respective downstream-side valve element 14. Compression coil spring 18 does not have flattened end turns at its opposite ends but each end portion is formed by simply cutting a wire member, as has been explained in detail in connection with the first embodiment.

Consequently, the urging force of compression coil spring 18 acts upon each valve element 14 in an oblique direction inclined with respect to the axial direction of the expansion valve 10. Thus, the valve elements 14 never are allowed to laterally vibrate when opened or closed due to a change of the refrigerant flow, so that no noise is produced. Instead, they are laterally held in contact with their respective valve seat 13.

Figure 13:
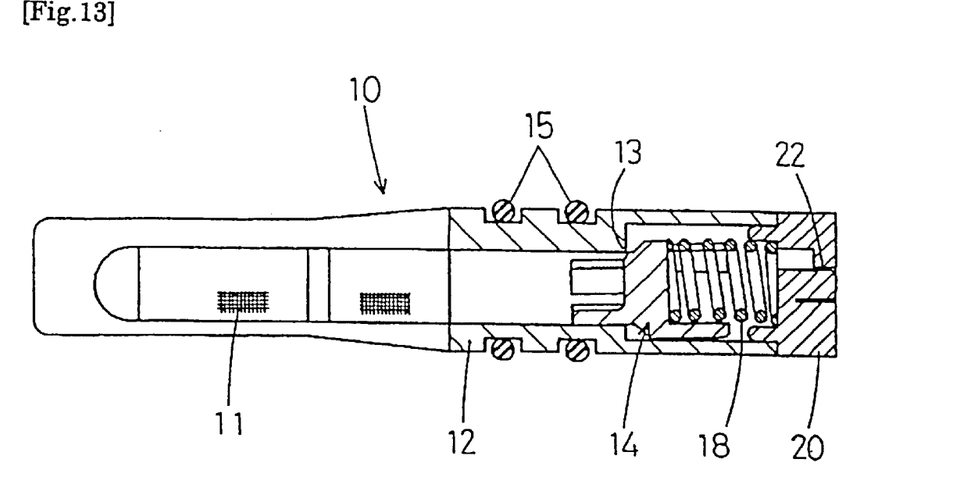

In FIG. 13 in a fourth embodiment compression coil spring 18 and valve element 14 are arranged eccentrically with respect to each other, i.e., the longitudinal axis of compression coil spring 18 or at least of its end portion and the longitudinal axis of valve element 14 are offset in lateral direction relative to another.

With this eccentric arrangement, even when compression coil spring 18 should have normal flattened end turns formed at its opposite ends, i.e., end turns in planes perpendicular to the longitudinal axes of the coil spring and the valve element, the urging force of the compression coil spring 18 acts upon valve element 14 in an oblique direction inclined with respect to the axial direction thereof. Accordingly, valve element 14 is always pressed against the inner peripheral surface of refrigerant passage 16 and thus is never allowed to vibrate laterally, so that no noise is produced.

Figure 14:
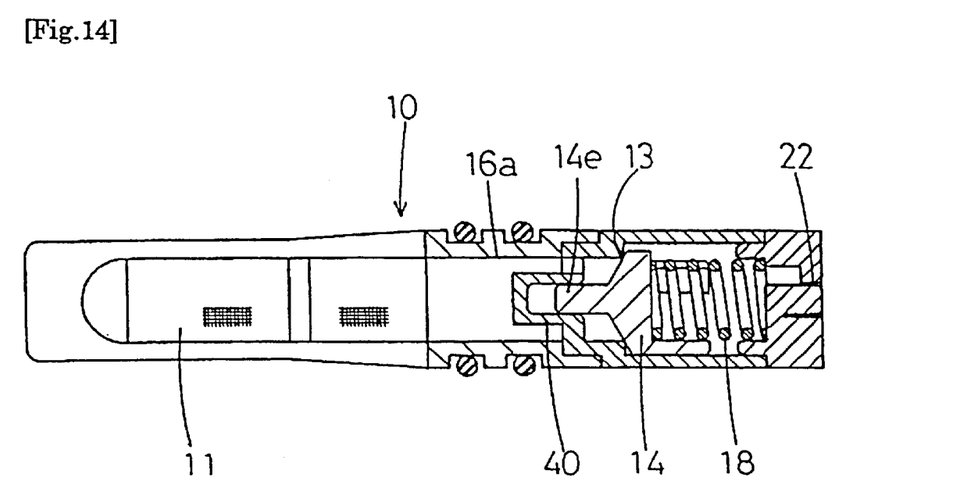

In FIG. 14 in a fifth embodiment a hydraulic vibration suppressing means is provided. A piston-like part 14e formed at the head of valve element 14 is received with a narrow radial gap in a cylinder 40 provided at the upstream-side refrigerant passage 16a. With valve element 14 moving, the refrigerant flows into and out of cylinder 40 through said gap defined between piston-like part 14a and its cylinder 40, thus forming a liquid damper using the refrigerant itself as a damping material. Thus, even fine axial vibrations of valve element 14 can be suppressed.

What is claimed is:

1. A supercooling degree-controlled expansion valve, comprising:
    a refrigerant passage for supplying refrigerant to an evaporator via a restricted portion formed by a narrowed intermediate portion of the refrigerant passage;
    valve seat upstream of the restricted portion;
    a valve element at a valve seat downstream side for opening and closing the refrigerant passage;
    resilient urging means contacting and biasing the valve element towards the valve seat from the valve seat downstream side such that the refrigerant is supplied to the evaporator while being adiabatically expanded with a degree of supercooling, wherein the degree of supercooling is maintained substantially constant at an upstream side of the valve seat;
    an inner peripheral surface of the refrigerant passage laterally surrounding the valve element with a radial clearance at the valve seat downstream side; and
    wherein the valve element, the urging means and the inner peripheral surface of the refrigerant passage commonly form a valve element lateral vibration suppressing structure.

2. The supercooling degree-controlled expansion valve according to claim 1, wherein the valve element includes a plurality of circumferentially distributed supporting legs at the valve seat downstream side, the supporting legs extending along the inner peripheral surface of the refrigerant passage, at least one of the supporting legs of the valve element, the inner peripheral surface of the refrigerant passage, and the urging means commonly acting as the valve element lateral vibration suppressing structure.

3. The supercooling degree-controlled expansion valve according to 1, wherein the urging means biases the valve element when lifted from the valve seat in an oblique direction inclined with respect to a center axis of the refrigerant passage into lateral contact with the surrounding inner peripheral surface of the refrigerant passage to suppress lateral vibrations of the valve element within the refrigerant passage.

4. The supercooling degree-controlled expansion valve according to claim 1, wherein the urging means is a compression coil spring consisting of a plurality of helical turns including a helical end turn, wherein the helical end turn includes a cut-off end contacting the valve element at a single urging force transmission spot located laterally offset with respect to a central axis of the valve element.

5. The supercooling degree-controlled expansion valve according to claim 1, wherein the urging means is contacting the valve element eccentrically with respect to a common central axis of the valve element and the valve seat such that the urging force of the urging means is acting upon the valve element in an oblique direction with respect to the common central axis of the valve element and the valve seat.

6. The supercooling degree-controlled expansion valve according to claim 1, wherein the urging means is contacting the valve seat at a downstream side abutment surface of the valve element, and wherein the abutment surface is inclined by an angle relative to a central axis of the valve element different from 90°.

7. The supercooling degree-controlled expansion valve according to claim 1, wherein a liquid damper using the refrigerant as a vibration absorbing material is coupled to the valve element to suppress axial vibrations of the valve element within the refrigerant passage, the liquid damper consisting of an open cylinder chamber inside of the valve seat at a valve seat upstream side and extending parallel to a common central axis of the valve seat and the valve element, and of a coaxial piston part of the valve element received in the cylinder chamber with radial clearance.

8. The supercooling degree-controlled expansion valve according to claim 1, wherein a second valve seat and a second valve element for the second valve seat are provided within the refrigerant passage with axial distance from the valve seat and the valve element and the second valve seat face each other with the valve element and the second valve element arranged inbetween and with a common urging means arranged between the valve element and the second valve element, and wherein a respective valve element lateral vibration suppressing structure is provided for the valve elements and the second valve element.

* * * * *